May 11, 1954
W. A. MOELLER
2,677,865
ANGLE IRON CLAMP
Filed May 19, 1952
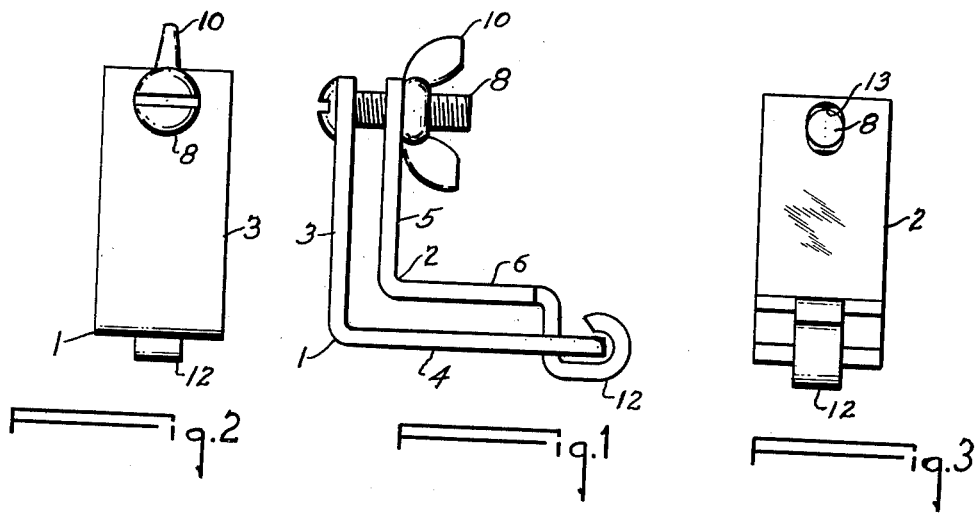
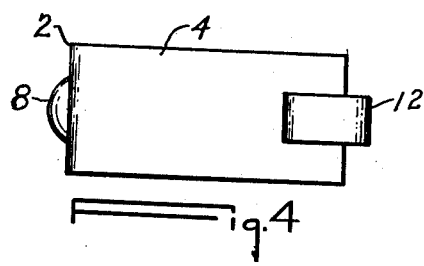
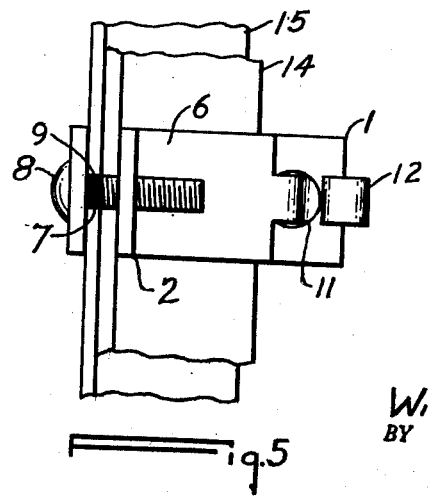
INVENTOR.
William A. Moeller
BY
Earl Moore
Atty.

Patented May 11, 1954

2,677,865

UNITED STATES PATENT OFFICE 2,677,865

ANGLE IRON CLAMP

William A. Moeller, Los Angeles, Calif.

Application May 19, 1952, Serial No. 288,647

1 Claim. (Cl. 24—248)

This invention belongs to that general class of devices known as clamps and relates particularly to a clamp for securely holding angle irons and the like together which may be very useful in the furniture industry as well as in erecting and maintaining scaffolding etc.

The invention has among its objects the production of a means of the kind described, and similar means, that is simple, durable and compact in structure, inexpensive to make and manufacture, dependable and efficient in use and service, and convenient to handle and store.

Other objects, advantages and features of this particular invention will appear from a careful perusal of the accompanying drawings, the subjoined and detailed description, the preamble of these specifications, and the claim appended hereto.

Below, applicant describes one of the preferable forms of his invention in order to teach the art thereof and show how to make and use the same, but it is to be understood that the drawings and description thereof are not to limit the invention in any sense whatsoever except as the same may be limited by the prior pertinent art.

In the drawings:

Figure 1 is a side elevational view of the invention showing its normal position and relation of its parts when employed to hold a pair of angle irons together;

Figure 2 is a side view of the device as shown in Figure 1;

Figure 3 is a face view of the device but with the wing nut removed;

Figure 4 is a bottom view;

Figure 5 is a top plan view of the device with the wing nut removed, and the device is illustrated in combination with a pair of angle irons to show how they are clamped together by the device.

This particular illustration of the invention comprises a pair of clamping elements, the bottom clamping element being indicated by the reference character 1 and the top clamping element being indicated by 2. The bottom element having the vertical leg 3 and the horizontal leg 4 whereas the top element has the vertical leg 5 and the horizontal leg 6.

The bottom element 1 has a bore 7 which accommodates a bolt 8 and this bore is preferably square to accommodate a square shank portion 9 on the bolt so that it will not turn when tightening the wing nut 10. At the end of the leg 4 there is a bore 11 (square or round) and which is designed to act as a pivot locus for a curved tongue 12 which is integral with the leg 6 of the clamping element 2. The narrowed tongue 12 loops around the edge of the leg 4 so as to form a hinge member which is not easily separated from the other angle piece 1.

The top portion of the leg 5 has a closed slot or oval hole 13 to allow the stem or bolt 8 a certain amount of free movement so that the clamp element 2 can be closely fitted against the clamp element 1 by turning the wing nut 10. Figure 5 of the drawings show how the elements are positioned with respect to the pair of angle irons 14 and 15.

It is, of course, understood that various changes and modifications may be made in the details of form, style, design, materials and construction of the whole or any part of the specifically described embodiment of this invention without departing from the spirit thereof; such changes and modifications are considered as being within the scope of the following claim:

I claim:

A clamp for angle irons and the like having a pair of angle elements wherein each element has a vertical leg integral with a horizontal leg and wherein one element is an outside element and the other element an inside element, one end of the outside element having a bolt fixed thereto and extending normal thereto and the other distal end thereof having a bore, the inside element having a bore therethrough at one end portion to receive the bolt and the other end of the inside element having a curved C-shape tongue which passes through the bore of the outside element and which tongue almost turns back upon itself in order to form a latch type of hinge, nut means engaging the bolt to hold the elements together, with adjacent legs of the pair in substantial parallelism.

References Cited in the file of this patent

UNITED STATES PATENTS

| Number | Name | Date |
| --- | --- | --- |
| 91,111 | French | June 8, 1869 |
| 1,333,420 | Iles | Mar. 9, 1920 |
| 2,080,261 | Funk | May 11, 1937 |
| 2,544,989 | Garibaldi | Mar. 13, 1951 |
| 2,559,187 | Clapp | July 3, 1951 |